United States Patent
Delapaz

(10) Patent No.: US 7,213,878 B2
(45) Date of Patent: May 8, 2007

(54) THERMALLY INSULATED COVER FOR BABY STROLLER

(75) Inventor: Christina Delapaz, Astoria, NY (US)

(73) Assignee: T & C Innovators, Inc., Astoria, NY (US)

( * ) Notice: Subject to any disclaimer, the term of this patent is extended or adjusted under 35 U.S.C. 154(b) by 0 days.

(21) Appl. No.: 11/060,098

(22) Filed: Feb. 17, 2005

(65) Prior Publication Data

US 2006/0181121 A1    Aug. 17, 2006

(51) Int. Cl.
*A47C 31/00* (2006.01)
(52) U.S. Cl. .............. 297/219.12; 297/219.1; 297/184.1; 297/184.12; 297/184.13; 297/184.11
(58) Field of Classification Search .......... 5/94, 5/655; 297/219.12, 354.12, 219.1, 184.11, 297/184.12, 184.13, 184.14, 184.1
See application file for complete search history.

(56) References Cited

U.S. PATENT DOCUMENTS

| | | | | |
|---|---|---|---|---|
| 4,098,536 A | * | 7/1978 | Mills | 296/77.1 |
| 4,852,598 A | * | 8/1989 | Griesenbeck | 135/137 |
| 5,184,865 A | * | 2/1993 | Mohtasham et al. | 296/77.1 |
| 5,494,329 A | * | 2/1996 | Gonzalez et al. | 297/184.13 |
| 5,624,156 A | * | 4/1997 | Leal et al. | 297/217.4 |
| 5,730,490 A | * | 3/1998 | Mortenson | 297/184.13 |
| 6,012,184 A | * | 1/2000 | Childers | 5/416 |
| 6,068,322 A | * | 5/2000 | Kuester | 296/97.21 |
| 6,217,099 B1 | * | 4/2001 | McKinney et al. | 296/77.1 |
| 6,224,073 B1 | * | 5/2001 | Au | 280/47.38 |
| 6,263,894 B1 | * | 7/2001 | LaMantia | 135/96 |
| 6,908,148 B2 | * | 6/2005 | Wang et al. | 297/184.13 |
| 6,918,631 B2 | * | 7/2005 | Verbovszky | 297/219.12 |

* cited by examiner

*Primary Examiner*—David R. Dunn
*Assistant Examiner*—Erika Garrett
(74) *Attorney, Agent, or Firm*—Day Pitney LLP

(57) ABSTRACT

A cover for a baby stroller is disclosed. The cover includes thermally insulated panels for retaining warmth for use in cold weather. The front panel includes an umbrella-shaped window with zipper access to allow the baby to be removed from or replaced into the baby stroller. The use of a rear zipper and top and bottom pull strings allows the cover to be attached to a range of baby strollers. By varying the manufactured dimensions of the panels of the cover, covers can be supplied for a very broad range of baby strollers.

15 Claims, 3 Drawing Sheets

THERMALLY INSULATED COVER FOR BABY STROLLER

BACKGROUND OF THE INVENTION

1. Field of the Invention

The present invention pertains to a thermally insulated, waterproof and breathable cover for a baby stroller. This allows the stroller to be used during cold weather while protecting the baby.

2. Description of the Prior Art

In the prior art, it is well known to provide covers for baby strollers in order to shield the child from sun, rain and insects. Examples of such prior art include U.S. Pat. No. 6,402,225 entitled "Canopy Windshield of Stroller"; U.S. Pat. No. 6,224,073 entitled "Wind Screen Assembly for a Baby Stroller"; U.S. Pat. No. 6,217,099 entitled "Multi-Layer Protective Shield for Stroller"; U.S. Pat. No. 6,012,756 entitled "UV50+ Protector-Pram/Stroller/Capsule Covers"; U.S. Pat. No. 5,975,613 entitled "Stroller Shading Device"; U.S. Pat. No. 5,975,558 entitled "Adjustable Shade for a Stroller"; U.S. Pat. No. 5,542,732 entitled "Combined Supplemental Shading and Carrier Apparatus for a Canopied Stroller"; U.S. Pat. No. 5,184,865 entitled "Insect Netting for Baby Stroller"; U.S. Pat. No. 4,582,355 entitled "Retractable Weather Guard for Child Stroller or Carriage Vehicle"; U.S. Pat. No. 4,533,170 entitled "Stroller Cover and Support Frame Therefor"; International Publication No. WO 02/090168 A1 entitled "Stroller Weather Shield Having See-Through Window"; European Patent EP 0 913 312 A2; and Japanese Patent P2003-54416A.

However, these references do not appear to disclose thermal insulation for the protection of a child in cold weather. Moreover, while these references may be satisfactory in some respects, these references do not disclose baby strollers with many integrated features, such as an umbrella shaped window with a zipper to provide access to the child without having to remove the cover; mesh sections in the insulated material to provide for circulation of air; luminescent or glow-in-the-dark safety strips; and a music box to entertain the child.

OBJECTS AND SUMMARY OF THE INVENTION

It is therefore an object of the present invention to provide a cover for a baby stroller which is thermally insulated for use in cold weather.

It is therefore a further object of the present invention to provide a cover for a baby stroller which provides for circulation of a sufficient amount of air for the child to breathe fresh air while remaining warm.

It is therefore a still further object of the present invention to provide a cover for a baby stroller which provides a wide view of the surrounding scenery to the baby.

It is therefore a still further object of the present invention to provide a cover for a baby stroller which provides simple access to the baby without having to remove the cover from the stroller.

It is therefore a still further object of the present invention to provide a cover for a baby stroller which includes a musical box for the entertainment of the child.

It is therefore a final object of the present invention to provide a cover for a baby stroller with a design which is adaptable to a wide range of baby strollers, such as single stroller, double strollers (either side-by-side or back-and-front) or jogger strollers.

These and other objects are attained by providing a cover for a baby stroller which is comprised of a plurality of panels of thermally insulated material. Typically, there is a front panel with a round umbrella shaped window with zipper access, two side panels extending from opposite sides of the front panel with mesh portions to allow air circulation without compromising the thermal insulation; two back panels extending from the side panels whereby the back panels extend around the back of the stroller and are secured to each other by way of a zipper; a top cover made of insulated material or, alternatively, plastic; and top and bottom elastic pull strings to secure the cover to the baby stroller. The front, side and back panels may include luminescent or "glow-in-the-dark" exterior material to enhance safety during darkened conditions. A small battery-powered music box may be affixed to the interior of one of the panels, such as one of the back panels, with an on-off button extending through the panel for easy access by the parent or care-giver.

BRIEF DESCRIPTION OF THE DRAWINGS

Further objects and advantages of the invention will become apparent from the following description and from the accompanying drawings, wherein.

DETAILED DESCRIPTION OF THE PREFERRED EMBODIMENT

Figure 1:
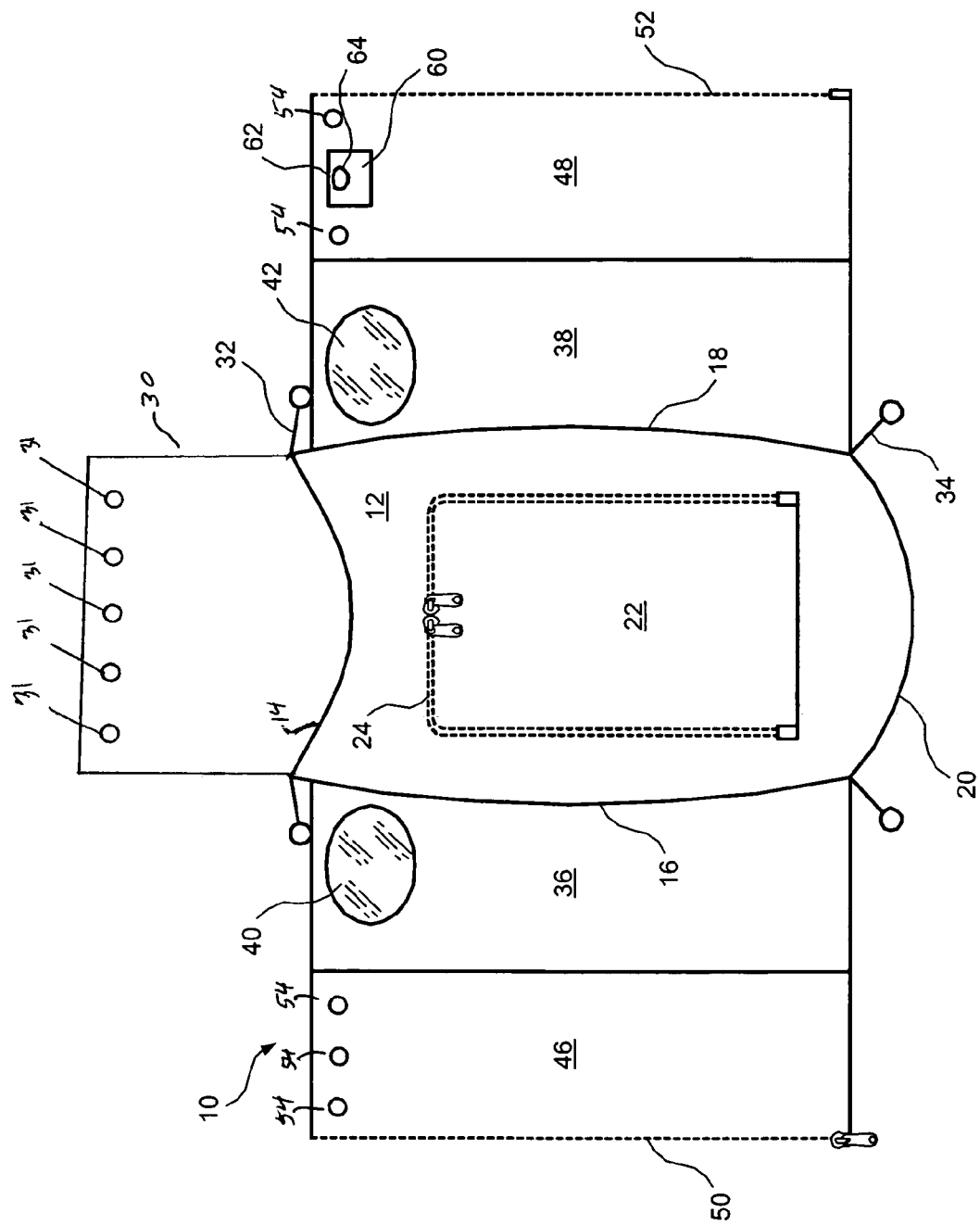
FIG. 1 is a plan view of the stroller cover of the present invention.

Referring now to the drawings in detail, wherein like numerals refer to like elements throughout the several views, one sees that FIG. 1 is a plan view of the stroller cover 10 of the present invention, shown with the panels laid flat in an uninstalled position.

The front panel 12 is generally rectangular shaped with a top edge 14, sides 16, 18, a bottom edge 20, and a clear plastic window 22 in the central area. The clear plastic window 22 may be of an umbrella shape so that it is comprised of a roughly hemispherical outwardly extending protrusion or, alternately, of clear panels which are arranged at slight angles to one another to provide a wide range of view to the child in the stroller. Moreover, the clear plastic window 22 has a zipper 24 about a portion of the periphery thereof bordering the front panel 12 to permit the parent or care-giver to unzip the zipper 24 and swing the clear plastic window 22 away so as to provide access to the child without having to remove the cover.

The front panel 12, as well as the other panels described hereinafter, is comprised of thermally insulated material to retain heat during cold or inclement weather and which is further water-resistant. Quilted material which is lined with plastic or water-repellant cloth is a typical material. Likewise, two layers of plastic or water-repellant cloth could have fiber batting therebetween. However, those skilled in the art will recognize a range of equivalents after review of the present disclosure.

The top edge 14 of the front panel 12 joins the top cover 30 which may be thermally insulated material, but further, unlike the other panels, may also be plastic. Snaps 31 are formed along the rear surface of top cover 30. An elastic pull string 32 is formed around a portion of the periphery of the top cover 30 to allow the stroller cover 10 to be secured to a range of different strollers. Likewise, an elastic pull string 34; is formed around the bottom edge 20 of the front panel 12.

The side panels 36, 38 extend from the sides 16, 18 of the front panel 12. The side panels 36, 38 are formed of thermally insulated material but further include the mesh areas 40, 42 to allow for some circulation of fresh air without defeating the thermal insulation of cover 10. The side panels 36, 38 are typically folded with respect to the front panel 12 to extend along the sides of the baby stroller 100 (see FIG. 2).

The back panels 46, 48 extend from the side panels 36, 38 and terminate in the complementary portions 50, 52 of a zipper. This allows the back panels 46, 48 to be folded with respect to the side panels 36, 38 to extend along the rear of the baby stroller 100 (see FIGS. 2 and 3) and be secured to each other by the complementary portions 50, 52 of a zipper. Snaps 54 are formed along the top of back panels 46, 48. Snaps 54 are aligned to secure to the snaps 31 on top cover 30. Additionally, a battery-powered music box 60 can be secured to the interior of the back panel 48 with the on-off button 62 extending through an aperture 64 in the back panel 48 thereby allowing the parent or care-giver to turn the music box 60 on or off while walking with the baby stroller 100.

Figure 4:
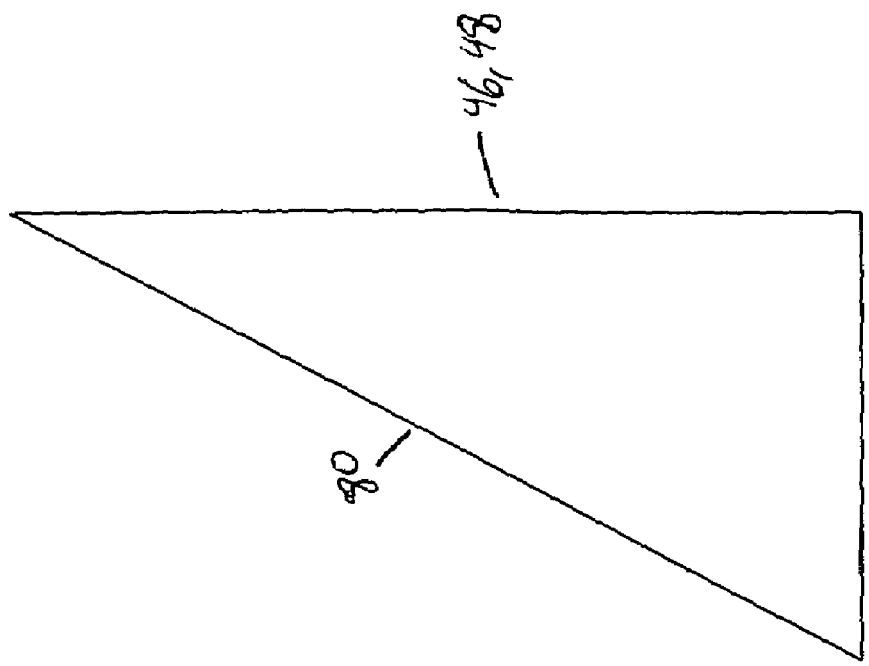
FIG. 4 is a side plan view of a pouch formed inside the back panels of the stroller cover of the present invention.

Furthermore, as shown in FIG. 4, a pouch 80 can be formed on the inside of back panels 46, 48, typically for holding the large number of items required for infant care.

The dimensions of the various panels within the stroller cover 10 can be chosen during manufacturing to provide stroller covers for a very wide range of strollers.

Additionally, to provide for increased visibility and increased safety, luminescent or glow-in-the dark strips (not shown) can be added around the front panel 12, the side panels 36, 38 and the back panels 46, 48.

Figure 2:
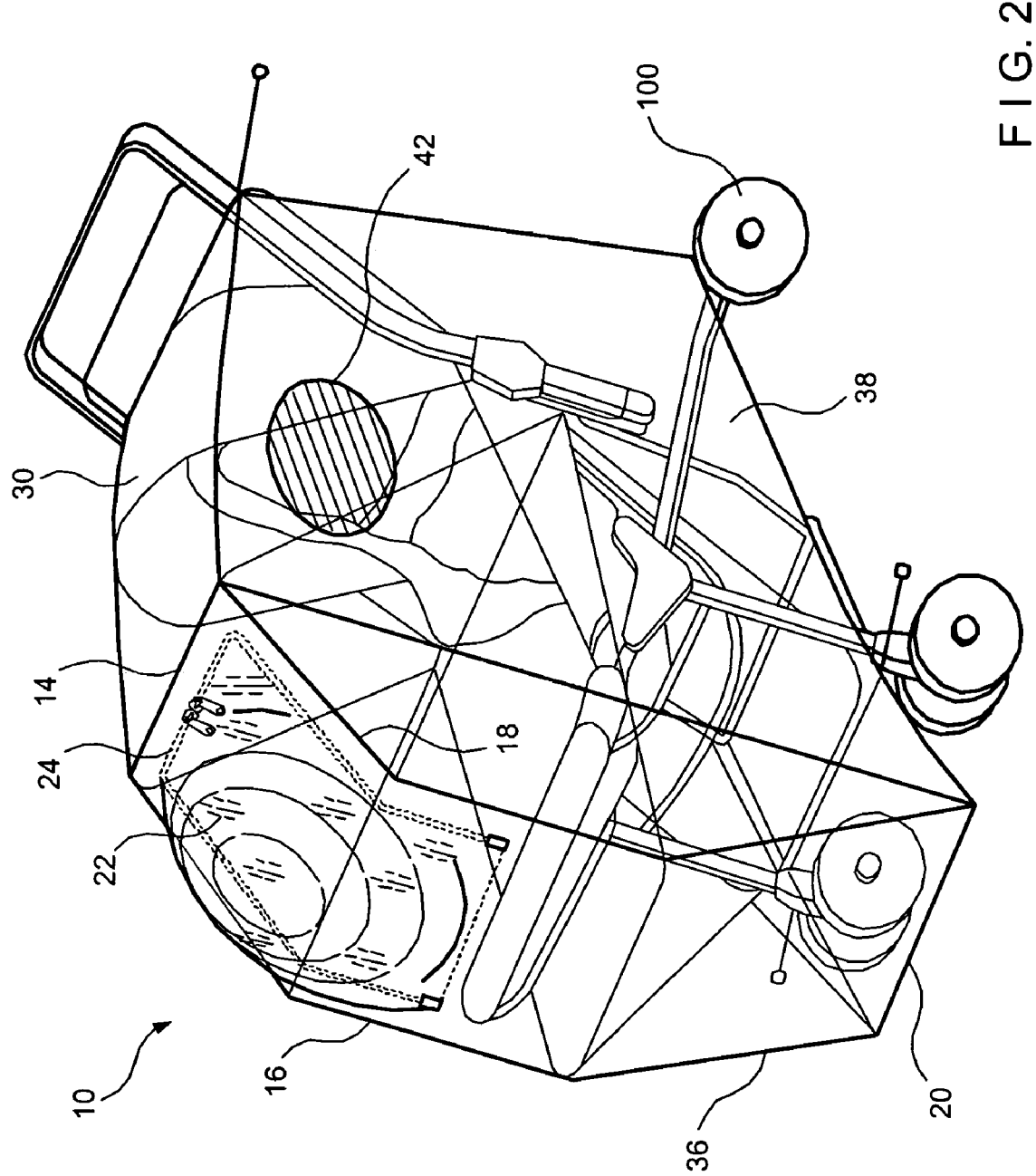
FIG. 2 is a perspective view of the stroller cover of the present invention, shown in phantom, placed over a conventional single stroller.
Figure 3:
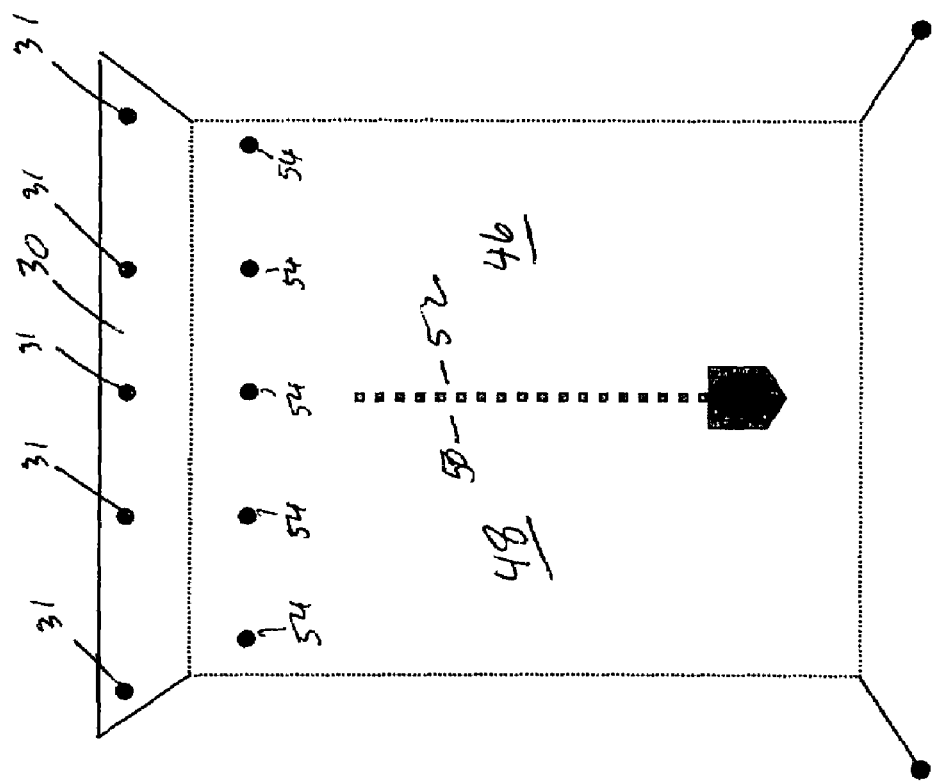
FIG. 3 is a plan view of the rear of the stroller cover of the present invention, as installed over a stroller.

To use stroller cover 10, the parent or care-giver places the stroller cover over a baby stroller 100 so that the top cover 30 is over the baby stroller 100, with the front panel 12 in the front and the side panels 36, 38 to the respective sides. The back panels 46, 48 are folded around the back of the baby stroller 100 and the complementary portions 50, 52 of a zipper are secured to each other. Snaps 31 on top cover 30 are snapped to snaps 54 on back panels 46, 48 as shown in FIG. 3. The pull strings 32, 34 are pulled tight and the configuration of FIG. 2 is achieved. If the child is not already in the baby stroller 100, the zipper 24 around the clear plastic window 22 is unzipped, the clear plastic window 22 is swung away, the child is inserted into the baby stroller 100, the plastic window 22 is returned to its position and the zipper 24 is zipped shut. Finally, the parent or care-giver can choose whether or not to turn on the music box 60. The child, along with the parent or care-giver, is now ready to face inclement weather.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A cover for a baby stroller including:
    a thermally insulated front panel to retain warmth;
    thermally insulated side panels to retain warmth;
    at least one thermally insulated rear panel to retain warmth, including an edge joined to edges of said side panels;
    a thermally insulated top panel to retain warmth, including an edge joined to a top edge of said front panel:
    an opening formed in said front panel of sufficient size for a child to pass therethrough;
    a transparent window detachably connected to and selectively covering said opening;
    a releasable access element formed between said transparent window and said front panel to provide access therethrough;
    at least one of said front panel or said side panels including ventilation apertures; and
    at least one attachment device to secure the cover to a baby stroller.

2. The cover of claim 1 wherein said at least one attachment device is at least one string device.

3. The cover of claim 2 wherein said at least one string device is at least one pull string.

4. The cover of claim 3 wherein said at least one pull string includes a first pull string at a top of said front panel and a second pull string at a bottom of said front panel.

5. The cover of claim 1 wherein said releasable access element is a zipper formed between said front panel and said window.

6. The cover of claim 1 wherein said front panel, said side panels and said at least one rear panel are formed of quilted material between layers of plastic or water-repellant fabric.

7. The cover of claim 1 wherein said front panel, said side panels and said at least one rear panel are formed of batting material formed between layers of plastic or water-repellant fabric.

8. The cover of claim 1 wherein said window protrudes from said front cover.

9. The cover of claim 1 wherein said window is a partially spherical outwardly extending protrusion.

10. The cover of claim 1 further including a sound producing box on an interior of the cover.

11. The cover of claim 1 wherein a control for said sound producing box extends through an aperture formed in said cover.

12. The cover of claim 1 further including luminescent exterior portions.

13. The cover of claim 1 wherein said top panel includes first securing elements to attach to second securing elements on said at least one rear panel.

14. The cover of claim 13 wherein said first and second securing elements are snap elements.

15. The cover of claim 1 further including a pouch formed on an interior of said at least one rear panel.

\* \* \* \* \*